(12) United States Patent
Morishita et al.

(10) Patent No.: US 11,784,534 B2
(45) Date of Patent: Oct. 10, 2023

(54) ROTATING ELECTRIC MACHINE

(71) Applicant: DENSO CORPORATION, Kariya (JP)

(72) Inventors: Shun Morishita, Kariya (JP); Toru Oiwa, Kariya (JP)

(73) Assignee: DENSO CORPORATION, Kariya (JP)

( * ) Notice: Subject to any disclaimer, the term of this patent is extended or adjusted under 35 U.S.C. 154(b) by 349 days.

(21) Appl. No.: 16/869,958

(22) Filed: May 8, 2020

(65) Prior Publication Data

US 2020/0366158 A1 Nov. 19, 2020

(30) Foreign Application Priority Data

May 13, 2019 (JP) ................................ 2019-090623

(51) Int. Cl.
| | |
|---|---|
| *H02K 5/24* | (2006.01) |
| *B62D 5/04* | (2006.01) |
| *H02K 1/16* | (2006.01) |
| *H02K 1/27* | (2022.01) |
| *H02K 5/04* | (2006.01) |
| *H02K 1/276* | (2022.01) |

(52) U.S. Cl.
CPC ............. *H02K 5/24* (2013.01); *B62D 5/0403* (2013.01); *H02K 1/165* (2013.01); *H02K 1/276* (2013.01)

(58) Field of Classification Search
CPC . H02K 5/24; H02K 5/04; H02K 11/30; H02K 11/33; H02K 5/22; H02K 1/27; H02K 21/14
USPC ........................................... 310/89, 51, 156
See application file for complete search history.

(56) References Cited

U.S. PATENT DOCUMENTS

| | | | | |
|---|---|---|---|---|
| 2005/0046304 | A1* | 3/2005 | Tamaki ................ | H02K 21/046 310/254.1 |
| 2006/0006848 | A1* | 1/2006 | Kliman .................. | H02K 11/20 324/219 |
| 2012/0019096 | A1* | 1/2012 | Taniguchi .............. | H02K 1/165 310/216.069 |
| 2013/0026872 | A1* | 1/2013 | Cirani .................. | H02K 1/2766 310/156.08 |
| 2014/0009041 | A1 | 1/2014 | Kawasaki et al. | |

(Continued)

FOREIGN PATENT DOCUMENTS

| | | |
|---|---|---|
| JP | 2016-077069 A | 5/2016 |
| JP | 2016-158475 A | 9/2016 |

(Continued)

OTHER PUBLICATIONS

JP-2016158475-A (English Translation) (Year: 2016).*

*Primary Examiner* — John K Kim

(74) *Attorney, Agent, or Firm* — MASCHOFF BRENNAN

(57) ABSTRACT

A motor having an iron stator, an iron rotor, and an aluminum rear frame serving as a heat sink The stator is fixed onto an inner wall of a housing by an interference fit, and two sets of three-phase windings are wound thereon so that a phase difference between the two sets of windings is $(30\pm60\times n)°$ (i.e., n is an integer), the rotor is provided inside the stator and rotates about a shaft by a rotating magnetic field generated by the stator due to energization of the three-phase windings, and the rear frame is fixed onto the inner wall of the housing by an interference fit, and holds a rear bearing that rotatably supports the shaft on one side of the rear frame in an axial direction.

11 Claims, 10 Drawing Sheets

(56) References Cited

U.S. PATENT DOCUMENTS

| | | | |
|---|---|---|---|
| 2014/0361655 A1* | 12/2014 | Liu | H02K 1/278 |
| | | | 310/156.12 |
| 2015/0222155 A1* | 8/2015 | Nakayama | B23K 9/167 |
| | | | 29/596 |
| 2015/0222156 A1* | 8/2015 | Tomizawa | H02K 5/10 |
| | | | 310/88 |
| 2016/0036299 A1 | 2/2016 | Hayashi | |
| 2017/0005539 A1* | 1/2017 | Yamasaki | H02K 5/02 |
| 2017/0117834 A1* | 4/2017 | Fujii | H02P 21/24 |
| 2017/0373627 A1 | 12/2017 | Suzuki | |
| 2018/0026492 A1* | 1/2018 | Takizawa | H02K 11/00 |
| | | | 310/68 R |
| 2018/0316239 A1 | 11/2018 | Ogawa et al. | |
| 2019/0036389 A1 | 1/2019 | Isogai et al. | |
| 2019/0047613 A1 | 2/2019 | Kano et al. | |
| 2020/0366158 A1* | 11/2020 | Morishita | H02K 5/24 |

FOREIGN PATENT DOCUMENTS

| | | | |
|---|---|---|---|
| JP | 2016158475 A | * | 9/2016 |
| JP | 2018-046713 A | | 3/2018 |

\* cited by examiner

ROTATING ELECTRIC MACHINE

CROSS REFERENCE TO RELATED APPLICATION

The present application is based on and claims the benefit of priority of Japanese Patent Application No. 2019-090623, filed on May 13, 2019, the disclosure of which is incorporated herein by reference.

TECHNICAL FIELD

The present disclosure generally relates to a motor.

BACKGROUND INFORMATION

The related art includes a motor in which a rotor is rotatably disposed inside a stator, a configuration in which the stator and a rear frame are fixed onto an inner wall of a cylindrical housing by an interference fit. Here, the rear frame is a member provided in, i.e., to close, an opening on the opposite side to a bottom of the housing in the axial direction. For example, the rear frame may support a substrate on which a drive circuit is implemented, and may function as a heat sink that releases heat generated by elements on the substrate.

For example, in a rotating electric machine disclosed in the related art, a flange (that is, a rear frame) is fixed onto the opening of the housing by shrink fit, and a stator is press-fitted or shrink-fitted to an inner periphery of the housing.

In such a rotating electric machine, a preload application member such as a wave washer is disposed in a preload application section formed on a flange side bearing holding section at the center of the flange. Then, by pressing a rotor shaft to one side by the preload application member, annoying noise generated by the rotor shaft due to its shakiness in the axial direction of the rotor shaft is suppressed.

In the rotating electric machine described in the related art, when the preload application member presses the rotor shaft to one side, while shakiness is reduced, resonance occurs, thereby causing vibration and noise accompanying therewith, which may be not really desirable as a trade-off of the shakiness suppression.

Further, in a motor that requires high reliability, such as a steering assist motor that is applied to an electric power steering device of a vehicle, motor windings, a drive circuit, and the like are redundantly provided in two systems, for example, and failure on one side (i.e., in one of the two systems) is covered by the other (i.e., normally operating) system for a continuation of drive of the steering assist motor. In a two-system drive motor, in addition to abnormal noise caused by shakiness in the axial direction of the rotor shaft, noise and vibration may also be caused due to a torque ripple in an order corresponding to the number of phases, e.g., in the sixth order corresponding to the three phases of the motor windings. However, the related art is silent about suppression of noise and vibration caused by such torque ripple.

SUMMARY

It is an object of the present disclosure is to provide a two-system drive motor devised with quietness (i.e., noise prevention scheme) and low vibration in a structural configuration in which a stator and a rear frame are fixed onto an inner wall of a cylindrical housing by an interference fit.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Embodiment

Hereinafter, an embodiment of a motor is described based on the drawings. The motor of the present embodiment is a motor applied to an electric power steering device for a vehicle and for generating a steering assist torque. The motor of the present embodiment is an "electromechanical-integrated type" motor in which an ECU (i.e., electronic control unit, which serves as a control device) is integrally formed on one side in the axial direction of the motor.

Figure 1:
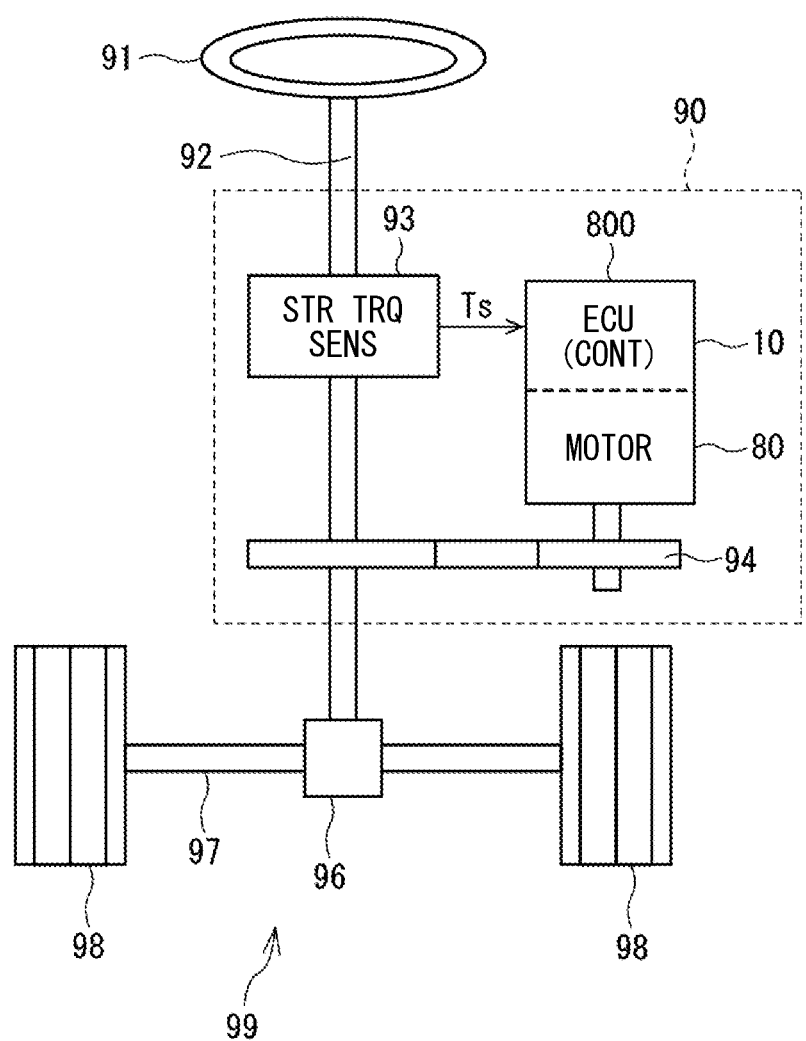
FIG. 1 is a configuration diagram of an electric power steering apparatus to which a motor according to an embodiment is applied.

First, referring to FIG. 1, a configuration example of the electric power steering device 90 is shown. A steering system 99 includes a steering wheel 91, a steering shaft 92, a pinion gear 96, a rack shaft 97, a pair of road wheels 98, the electric power steering device 90 and the like. Although the electric power steering device 90 shown in FIG. 1 is a column assist type, the motor of the present embodiment can similarly be applied to a rack assist type electric power steering device.

The steering shaft 92 is coupled to the steering wheel 91. The pinion gear 96 provided at an axial end of the steering shaft 92 engages with the rack shaft 97. The pair of road wheels 98 is provided at both ends of the rack shaft 97 via, for example, tie rods. When a driver rotates the steering wheel 91, the steering shaft 92 coupled to the steering wheel 91 rotates. A rotational motion of the steering shaft 92 is converted into a linear motion of the rack shaft 97 by the pinion gear 96, and the pair of wheels 98 are steered at an angle corresponding to a displacement amount of the rack shaft 97.

The electric power steering device 90 includes a steering torque sensor 93, an electromechanical-integrated type motor 800, a speed reduction gear 94, and the like. The steering torque sensor 93 is provided in the middle of the steering shaft 92 and detects a steering torque Ts of the driver. In the electromechanical-integrated type motor 800, an electronic control unit, or ECU, 10 is integrally provided on one side of a motor 80 in the axial direction, wherein motor 800 includes motor 80. The ECU 10 controls a drive of the motor 80 so that the motor 80 generates a desired assist torque based on the steering torque Ts. The assist torque generated by the motor 80 is transmitted to the steering shaft 92 via the speed reduction gear 94.

Figure 2:
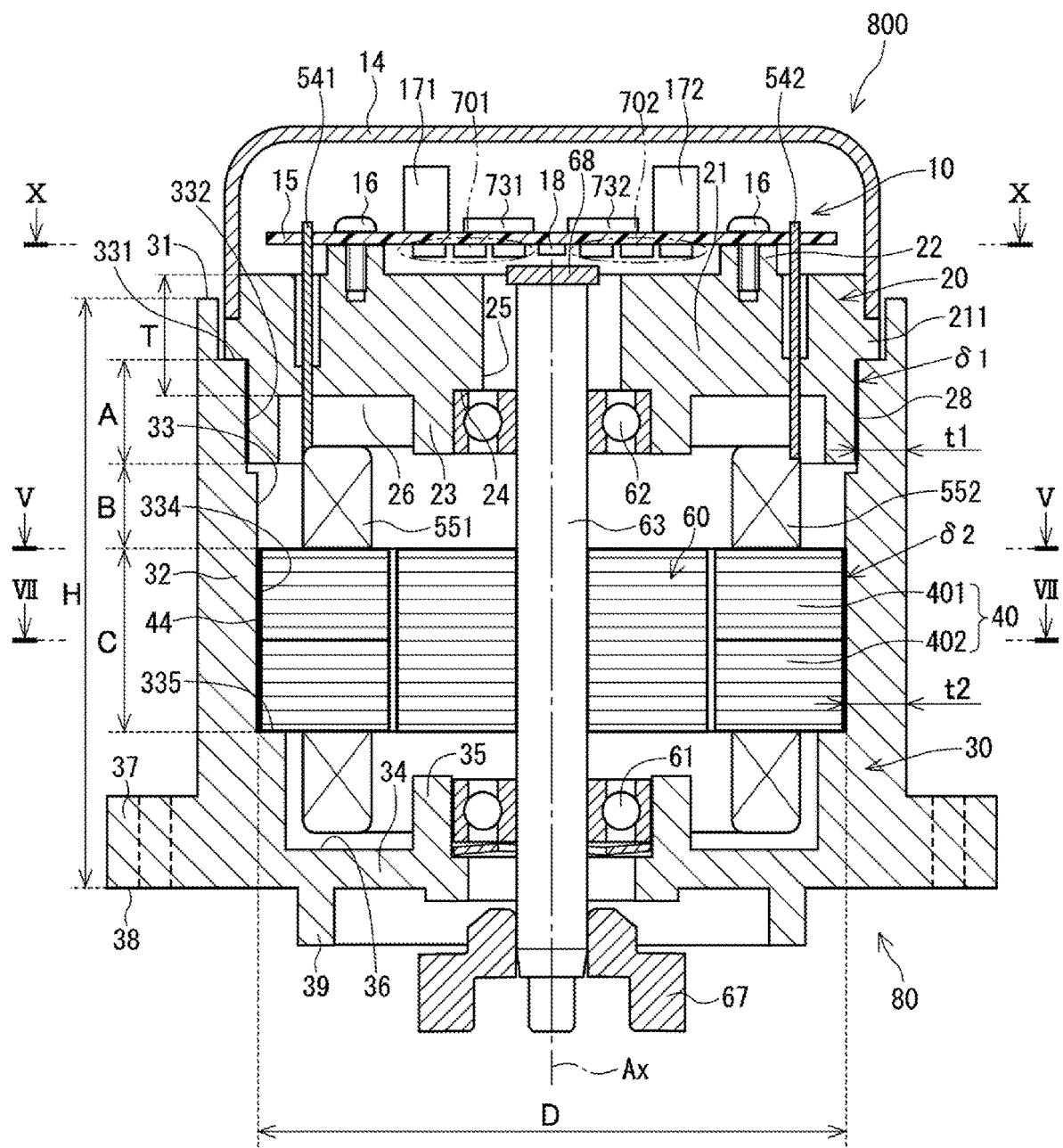
FIG. 2 is a schematic cross-sectional view of an electromechanical-integrated type motor according to an embodiment.

Next, with reference to FIG. 2, the structural configuration of the electromechanical-integrated type motor 800 in the axial cross section is described. An output shaft side of the motor 80 shown on the lower side of FIG. 2 is called a "front side", and a cover 14 side shown on the upper side of FIG. 2 is called a "rear side." A rotation axis of the motor 80 is designated as Ax. The ECU 10 is disposed coaxially with the rotation axis Ax on the rear side of the motor 80.

The motor 80 is a three-phase brushless motor, and includes a housing 30, a stator 40, a rotor 60, a rear frame 20, and the like. Here, the "rear frame" is a structural name indicating a support member provided on the rear side which is an opening of the housing 30. However, in the present embodiment, the rear frame functions as a heat sink that accepts heat dissipation from the elements implemented on the board of the ECU 10, so the name "heat sink" is mainly used in the following.

In the present embodiment, both of the stator 40 and a heat sink 20 are fixed onto the inner wall of the housing 30 by "an interference fit." The interference fit includes a press fit and a cold fit in addition to the shrink fit, but in the following description, the shrink fit is mainly assumed. Further, regarding the following description of the metal material, "made of aluminum" includes aluminum alloys such as ADC12 and "made of iron" includes iron alloys such as electromagnetic steel sheets.

The housing 30 is made of aluminum, and has a bottomed cylindrical shape including a cylindrical portion 32 and a bottom portion 34. An inner wall 33 of the cylindrical portion 32 is formed so that an inner diameter thereof gradually decreases in order from the opening side. A heat sink receiving step 331 near an end surface 31 receives a flange 211 of a main body 21 of the heat sink 20. In a heat sink fixing portion 332, a fixing portion outer wall 28 of the heat sink 20 is shrink-fitted. The axial length of the heat sink fixing portion 332 is designated as "A." A stator fixing portion 334 is shrink-fitted with an outer wall 44 of the stator 40. A stator receiving step 335 receives an outer edge of a front end surface of the stator 40.

A front bearing holder portion 35 that holds an outer ring of a front bearing 61 is provided at the bottom portion 34 of the housing 30. The front bearing 61 rotatably supports a shaft 63 on the front side in the axial direction. A recess 36 is formed outside the front bearing holder portion 35 as a space for accommodating three-phase windings 551 and 552 protruding from the front side of the stator 40.

A stay portion 37 for mounting the electric power steering device 90 on a gear box (not shown) is provided on the front side outside the cylindrical portion 32. At the time of mounting onto the gear box, a mounting seat surface 38 of the stay portion 37 is in contact with an end surface of the gear box while being positioned by an inlay portion 39 and is fixed by a bolt or the like. The axial length from the mounting seat surface 38 of the housing 30 to the end surface 31 on the heat sink 20 side is designated as "H."

The heat sink 20 is provided so as to face the rear side end surfaces of the stator 40 and the rotor 60 in the opening on the opposite side to the bottom portion 34 of the housing 30. An axial distance between the heat sink 20 and the stator 40 along the inner wall 33 of the housing 30 is designated as "B." The heat sink 20 has the thick plate-like main body 21 and several protrusions provided locally on both surfaces of the main body 21. As a local protrusion, a screw seat portion 22 used for screw fixing of a board 15 is provided on a surface of the main body 21 on the cover 14 side. A female screw hole is formed in the screw seat portion 22. Further, a rear bearing holder portion 23 that holds an outer ring of a rear bearing 62 is provided on the surface of the main body 21 on a rotor 60 side. The rear bearing 62 is accommodated in the rear bearing holder portion 23 so that the end surface thereof is in contact with a receiving surface 24, and rotatably supports the shaft 63 on the rear side in the axial direction.

The thickness of the main body 21 excluding the screw seat portion 22 and the rear bearing holder portion 23 corresponding to the "local protrusion" is designated as "T." Even when there are other local protrusions, the thickness of the main body 21 excluding the local protrusions is considered as "T" in accordance with the screw seat portion 22 and the rear bearing holder portion 23. On an outer periphery of the main body 21, the flange 211 supported by the heat sink receiving step 331 of the housing 30 is provided. A recess 26 is formed outside the rear bearing holder portion 23 as a space for accommodating the three-phase windings 551 and 552 protruding to the rear side of the stator 40.

A shaft hole 25 through which the shaft 63 is inserted is formed at a radial center of the heat sink 20. As is described later with reference to FIG. 10, the shaft hole 25 is not a perfect circle but is an oval shape. The fixing portion outer wall 28 of the heat sink 20 is fixed onto the heat sink fixing portion 332 of the inner wall 33 of the housing 30 by an interference fit.

The stator 40 is provided as a component made by stacking a plurality of layers of thin iron stator cores in the axial direction. The thickness of the stator 40 is designated as "C" and the diameter of the stator 40 is designated as "D." The plurality of stator cores are divided into a first stator 401 on the heat sink 20 side and a second stator 402 on the housing bottom portion 34 side to constitute a step skew structure. The step skew structure is described later with reference to FIGS. 5 to 8. The outer wall 44 of the stator 40 is fixed onto the stator fixing portion 334 of the inner wall 33 of the housing 30 by an interference fit. In the present embodiment, two systems of three-phase windings 551 and 552 are wound around the stator 40. The configuration of the two systems is described later with reference to FIGS. 3 and 4.

The rotor 60 is a component made by stacking a plurality of layers of thin iron rotor cores in the axial direction. The rotor 60 is provided inside the stator 40, and the shaft 63 is fixed at its center. The shaft 63 is rotatably supported by the front bearing 61 held on the housing bottom portion 34 and by the rear bearing 62 held on the heat sink 20.

As is described later with reference to FIGS. 5 to 8, the rotor 60 has a plurality of permanent magnets along its outer periphery, and is rotated by a rotating magnetic field generated in the stator 40 by the energization of the three-phase windings 551 and 552 about the shaft 63 as a rotation axis. A joint 67 that transmits rotation is provided at the front end of the shaft 63. A sensor magnet 68 for detecting a rotation angle is provided at the rear end of the shaft 63.

The ECU 10 includes the board 15 fixed onto the heat sink 20 and various electronic components implemented on the board 15. The cover 14 is installed so that an end surface thereof is in contact with the flange 211 of the heat sink 20, and protects electronic components implemented on the board 15 from external impacts and/or prevents entry of dust, water, and the like into the ECU 10. A connector (not shown) to which an external power supply cable or signal cable is connected may be provided as a part of the cover 14.

The board 15 is a printed circuit board, for example, and is fixed onto the screw seat portion 22 of the heat sink 20 with screws 16. On the board 15, elements for two systems are implemented independently for system to system. In such a state, a heat generating element may, for example, be brought into contact with the heat sink 20 directly or through a heat dissipation gel. In an example of FIG. 2, the number of the boards 15 is one. However, in other embodiments, two or more boards may be provided.

A plurality of switching elements of drive circuits 701 and 702, the rotation angle sensor 18 and the like are implemented on the surface of the board 15 facing the heat sink 20. The rotation angle sensor 18 is disposed so as to face the sensor magnet 68 provided at a tip of the shaft 63. Microcomputers 731 and 732, capacitors 171 and 172, and the like are implemented on a cover 14 side surface of the board 15. Further, motor terminals 541 and 542 that pass through the heat sink 20 and are connected to the three-phase windings 551 and 552 are connected to the board 15.

Next, a schematic configuration of the ECU 10 of the two-system motor is described with reference to FIGS. 3 and 4. The ECU 10 is implemented on the board 15 as two systems of components including the drive circuits 701 and 702, the microcomputers 731 and 732 and the like. In other embodiments, the number of microcomputers may be one. Hereinafter, a set of the constituent elements related to energization of each set of the three-phase windings 551 and 552 is referred to as a "system." The components of the first system have a name prefixed with "first," and the reference number has "1" at the end (i.e., as the last digit). Similarly, "second" is prefixed to the name of the component of the second system, and "2" is appended to the reference number.

The drive circuits 701 and 702 are configured as three-phase inverters in which switching elements such as MOSFETs are bridge-connected. Direct current (DC) electric power is supplied to the drive circuits 701 and 702 from batteries 111 and 112 via connectors 131 and 132. Smoothing capacitors 171 and 172 are connected to the input portions of the drive circuits 701 and 702. In other embodiments, the DC power may be supplied in parallel to the two systems from one battery.

The first microcomputer 731 calculates a drive signal Dr1 to the first drive circuit 701 by feedback control of the electric current supplied to the three-phase winding 551 of the first system. The first drive circuit 701 operates according to the drive signal Dr1, and applies a voltage to the three-phase winding 551. The second microcomputer 732 calculates a drive signal Dr2 to the second drive circuit 702 by feedback control of the electric current supplied to the second phase three-phase winding 552. The second drive circuit 702 operates according to the drive signal Dr2, and applies a voltage to the three-phase winding 552. Thereby, the motor 80 outputs a desired torque.

Figure 3:
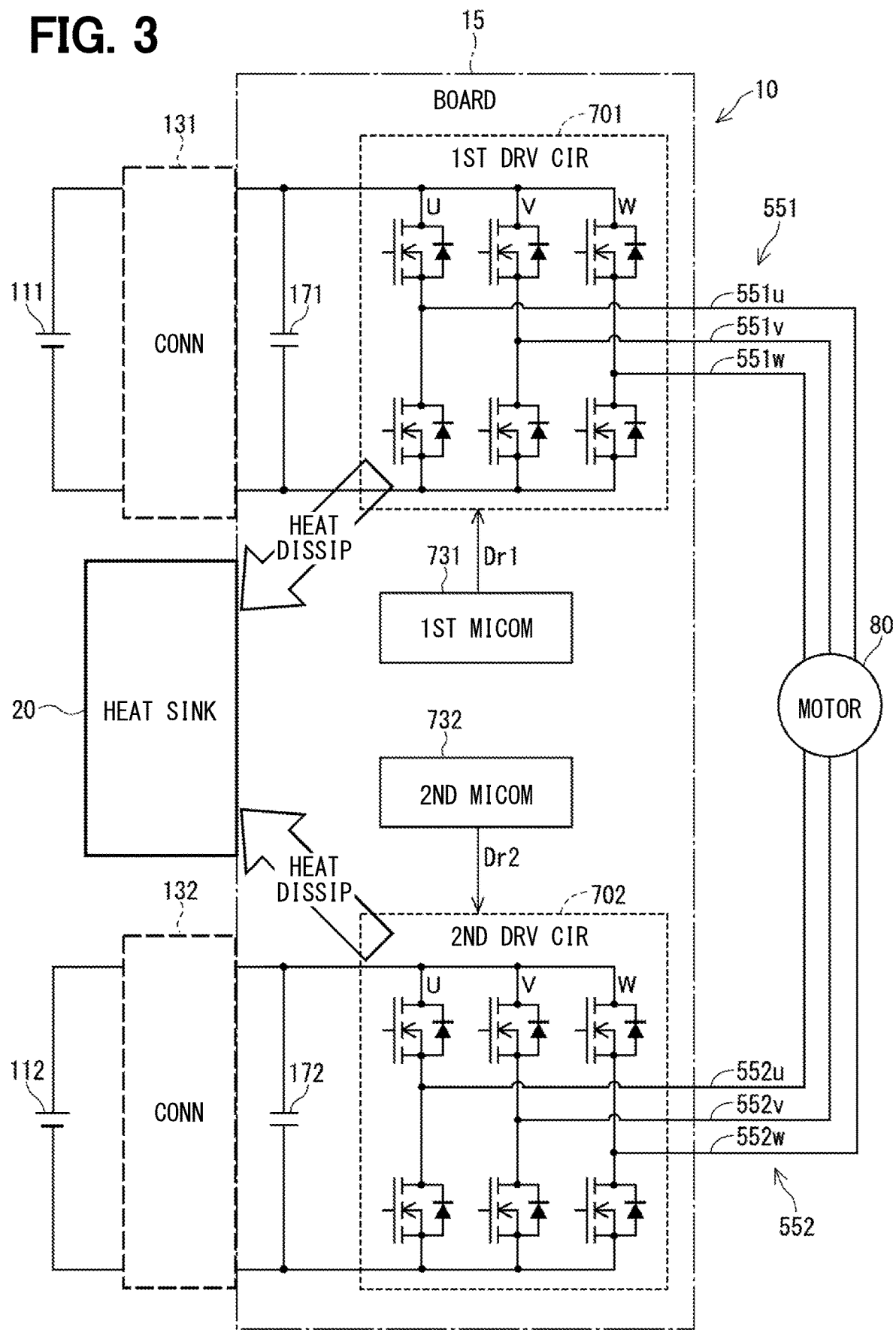
FIG. 3 is a schematic configuration diagram of an ECU of a two-system motor.

In FIG. 3, information regarding the following is omitted (i.e., is not depicted) That is, information such as torque instructions, actual currents, electric angles, and the like input to the microcomputers 731 and 732 from the devices and sensors such as torque sensors, current sensors, and rotation angle sensors is omitted therefrom. Further, the first microcomputer 731 and the second microcomputer 732 may exchange information mutually by communication therebetween, though illustration of which (i.e., regarding communication) is also omitted therefrom.

When the switching elements of the first drive circuit 701 and the second drive circuit 702 operate and the electric current flows through the circuit, thermal energy proportional to the square of the electric current is generated. Heat generated by the elements on the board 15 is dissipated to the heat sink 20 (i.e., to the rear frame 20). In other words, heat dissipation from the elements on the board 15 is absorbed by the heat sink 20. Absorption of heat by the heat sink 20 prevents temperature of the element from rising excessively and reaching heat resistance limit of the element.

Figure 4:
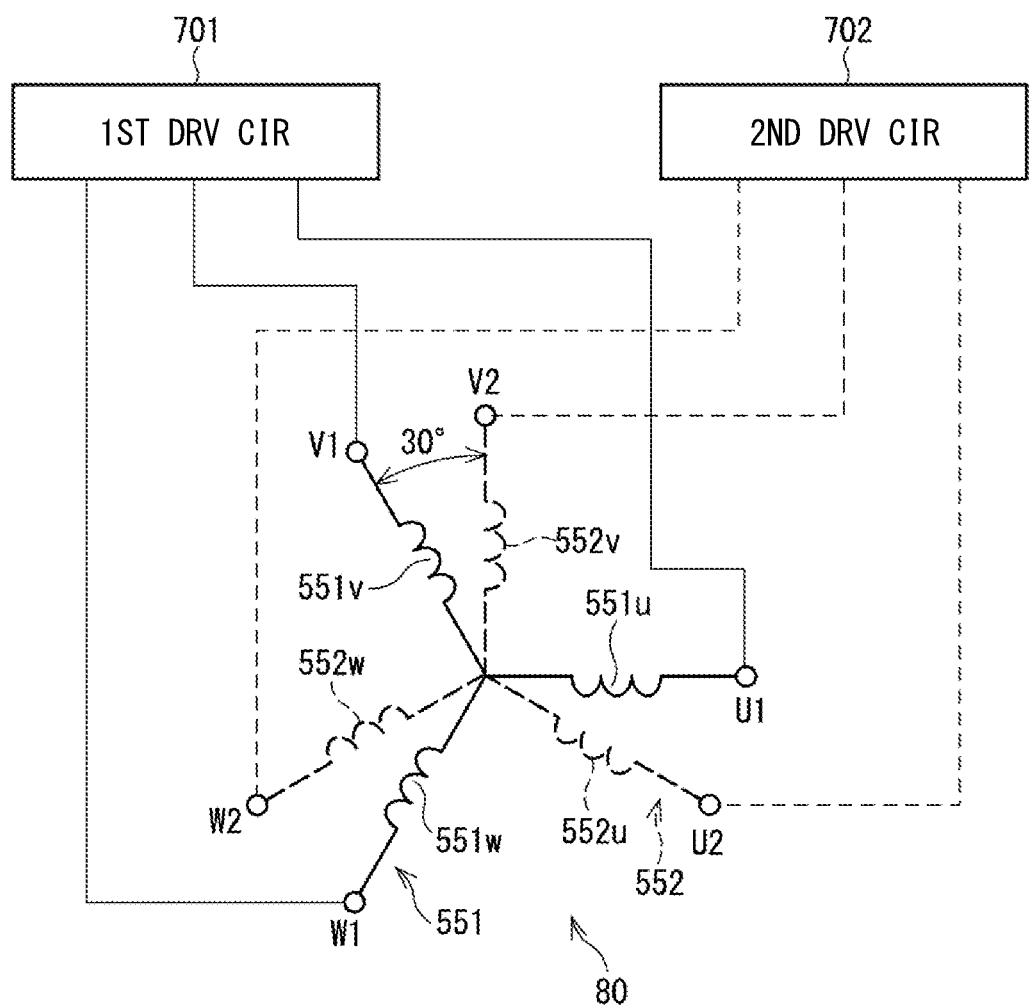
FIG. 4 is a schematic diagram of a phase difference between two systems of three-phase windings.

As shown in FIG. 4, the motor 80 is a three-phase brushless motor in which two sets of three-phase windings 551 and 552 are provided coaxially. The three-phase winding 551 of the first system includes a U-phase winding 551$u$, a V-phase winding 551$v$, and a W-phase winding 551$w$ respectively connected to the first drive circuit 701. The three-phase winding 552 of the second system includes a U-phase winding 552$u$, a V-phase winding 552$v$, and a W-phase winding 552$w$ respectively connected to the second drive circuit 702.

The two sets of three-phase windings 551 and 552 are wound around a common stator 40 so that the phase difference therebetween is set to an electric angle of 30°. Note that the same phases of the two systems need not be arranged adjacent to each other, that is, the replacement of the arrangement of the first system and the second system is allowed, i.e., probable, thereby the phase difference therebetween is generalized as an angle of $(30\pm60\times n)°$ (i.e., n is an integer).

Thereby, in the two-system drive motor 80 in which the stator 40 and the heat sink 20 are fixed onto the inner wall 33 of the cylindrical housing 30 by shrink fit, the sixth-order torque ripple is cancelable thereby improving quietness and reducing vibration (i.e., achieving low vibration). Note that the cancellation of the sixth-order torque ripple is disclosed in a Japanese Patent No. 5672278 (i.e., in a corresponding US publication: U.S. Pat. No. 9,214,886 B2).

Here, basic operational effects of the present embodiment within the scope of the above description is paraphrased. In the present embodiment, suppression of noise and vibration generated a motor drive time is intended as much as possible, for the improvement of quietness and low vibration. The quietness and the low vibration property are collectively referred to as "NV property." In other words, the main purpose of the present embodiment is to improve NV characteristics. First, in the present embodiment, the stator 40 is shrink-fitted to the housing 30 so that high-precision fixing with high/true roundness can be performed. Further, since the rear frame 20 functioning as a heat sink is fixed by shrink fit without using bolds, resonance due to shakiness can be prevented.

In the meantime, as a prior art of a motor in which the stator and the rear frame are fixed onto the housing by shrink fit, for example, the Patent Document 1 (Japanese Patent Laid-Open No. 2014-17955) discloses a noise prevention scheme, by which an abnormal noise caused by shakiness in the axial direction of the rotor shaft is suppressed. However, there is no mention of suppression of noise and vibration caused by the torque ripple.

On the other hand, in the present embodiment, two sets of three-phase windings 551 and 552 are wound around the stator 40 so that the phase difference therebetween is set to an angle of $(30\pm60\times n)°$ (i.e., n is an integer). Therefore, it is possible to cancel the sixth-order torque ripple in the two-system drive motor thereby improving the NV property. In particular, in an electric power steering device for a vehicle, noise and vibration due to torque ripple have a great influence on a driver's steering feeling and quality of the product, which is advantageously improved by the good NV property due to the effects of the present embodiment.

In addition, the heat sink 20 is provided with the recess 26 as a space for accommodating the three-phase windings 551 and 552 protruding to the rear side of the stator 40. By utilizing a vacant space, the size and weight of the motor can be reduced. Further, since the rigidity is increased and the resonance is suppressed by forming the unevenness (i.e., concave and convex) on the heat sink 20, quietness is improved.

Next, referring to FIG. 2 again, the dimensional relationship of each member in the present embodiment is further investigated as preferred conditions for further improving the quietness and the NV property, or for obtaining other effects such as downsizing and improved assemblability. First, a fastening margin and the wall thickness related to shrink fit of the heat sink 20 and the stator 40 and the housing 30 are set as follows. Here, the effects by the setting of various dimensional relationships are described together.

<1> A fastening margin δ2 between the stator 40 and the housing 30 is greater than a fastening margin δ1 between the heat sink 20 and the housing 30. That is, an equation (1) is established.

$$\delta 1 < \delta 2 \quad (1)$$

In such manner, the assembly by shrink fit of the heat sink 20 is performable. Since the heat sink 20 is shrink-fitted after the stator 40 is shrink-fitted, when temperature of the housing 30 is increased during the shrink-fit of the heat sink 20, the fastening margin of the stator fixing portion 334 is reduced and the stator 40 may possibly move. Therefore, the stator 40 can be made difficult to move by making the fastening margin δ2 of the stator 40 greater than the fastening margin δ1 of the heat sink 20. Further, by increasing the fixing force on the vibrating side of the stator 40, resonance can be prevented and quietness can be improved.

<2> In the cylindrical portion 32 of the housing 30, thickness t2 of the stator fixing portion 334 that is a portion to which the stator 40 is shrink-fitted is greater than thickness t1 of the heat sink fixing portion 332 that is a portion to which the heat sink 20 is shrink-fitted. That is, an equation (2) is established.

$$t1 < t2 \quad (2)$$

By making the thickness t1 of the heat sink fixing portion 332 relatively thin, heat conduction is promoted and temperature rise is decreased. Conversely, by increasing the thickness t2 of the stator fixing portion 334 relatively, heat conduction is suppressed, and the stator 40 can be made difficult to move when the heat sink 20 is shrink-fitted. Further, since the thickness of the fixing portion is reflected in the fixing force, the fixing force of the stator 40 is exerted greater than the fixing force of the heat sink 20. Therefore, in combination with the effect <1> described above, quietness can be further improved.

In an example of FIG. 2, a step is provided on the inner wall 33 of the housing 30 to realize the relationship of the equation (2). However, in other embodiments, a step may be provided on the outer wall of the housing. Next, the relationship between the dimensions indicated by the symbols "A, B, C, D, T, H" in FIG. 2 is described.

<3> The axial length A of the heat sink fixing portion 332 that is a fixing portion between the heat sink 20 and the housing 30 is greater than the axial distance B between the heat sink 20 and the stator 40 along the inner wall 33 of the housing 30. That is, an equation (3) is established.

$$A > B \quad (3)$$

Since aluminum is inferior in rigidity to iron, reserving a greater axial length A of the heat sink fixing portion 332 can prevent stress concentration on the heat sink 20 and improve quietness. In addition to improving the heat dissipation property of the heat sink 20, it guarantees the fixing force and strength of the fixing portion 332.

<4> The axial length A of the heat sink fixing portion 332 that is a fixing portion between the heat sink 20 and the housing 30 is greater than 0.4 times the thickness C of the stator 40. That is, an equation (4) is established.

$$A > 0.4C \quad (4)$$

By reserving a greater axial length A of the heat sink fixing portion 332, a thermal mass of the heat sink 20 is secured (i.e., increased), and the heat of the elements on the board 15 is more suitably dissipated. Further, the fixing force and strength is reliably provided and shakiness is prevented. Therefore, NV property is improved.

<5> The thickness C of the stator 40 is greater than twice the axial distance B between the heat sink 20 and the stator 40 along the inner wall 33 of the housing 30. That is, an equation (5) is established. Size reduction is achieved by reducing the axial distance B as much as possible.

$$C > 2B \quad (5)$$

<6> The thickness C of the stator 40 is greater than one third of the diameter D of the stator 40. That is, an equation (6) is established. By reducing a ration of the thickness against the diameter of the stator 40, the assembling property (i.e., assemblability) is improved.

$$C < D/3 \quad (6)$$

<7> "The thickness T of the main body 21 excluding local protrusions 22 and 23" is greater than one sixth of the axial length H from the mounting seat surface 38 on the stator 40 side to the end surface 31 on the rear frame 20 side in the housing 30. That is, an equation (7) is established.

$$T > H/6 \quad (7)$$

Increasing the thickness T of the main body 21 of the heat sink 20 securely provides the fixing force and improves heat dissipation property. Further, by increasing the rigidity of the heat sink 20 and preventing deformation, resonate is hardly caused. As a result, the roundness of the fixing portion outer wall 28 of the heat sink 20 is secured, and the NV property is improved.

Next, the detailed configuration of the stator 40 and the rotor 60 together with its effects are described with reference to FIGS. 5 to 8. As shown in FIG. 2, the stator 40 includes the first stator 401 on the heat sink 20 side and the second stator 402 on the housing bottom portion 34 side that are stacked along the axial direction. Each of the first stator 401 and the second stator 402 is configured by stacking a plurality of layers of thin plate stator cores integrally formed in the circumferential direction. That is, a core back is continuous over the entire circumference.

Thus, the stator core integrally formed along the circumference provides higher rigidity as compared with the configuration of the split core. Further, the core back continuously provided over the entire circumference enables abutment of the entire outer periphery against the inner wall 334 of the housing 30 during the shrink fit process. Therefore, the high roundness is reserved and the quietness is improved.

Figure 5:
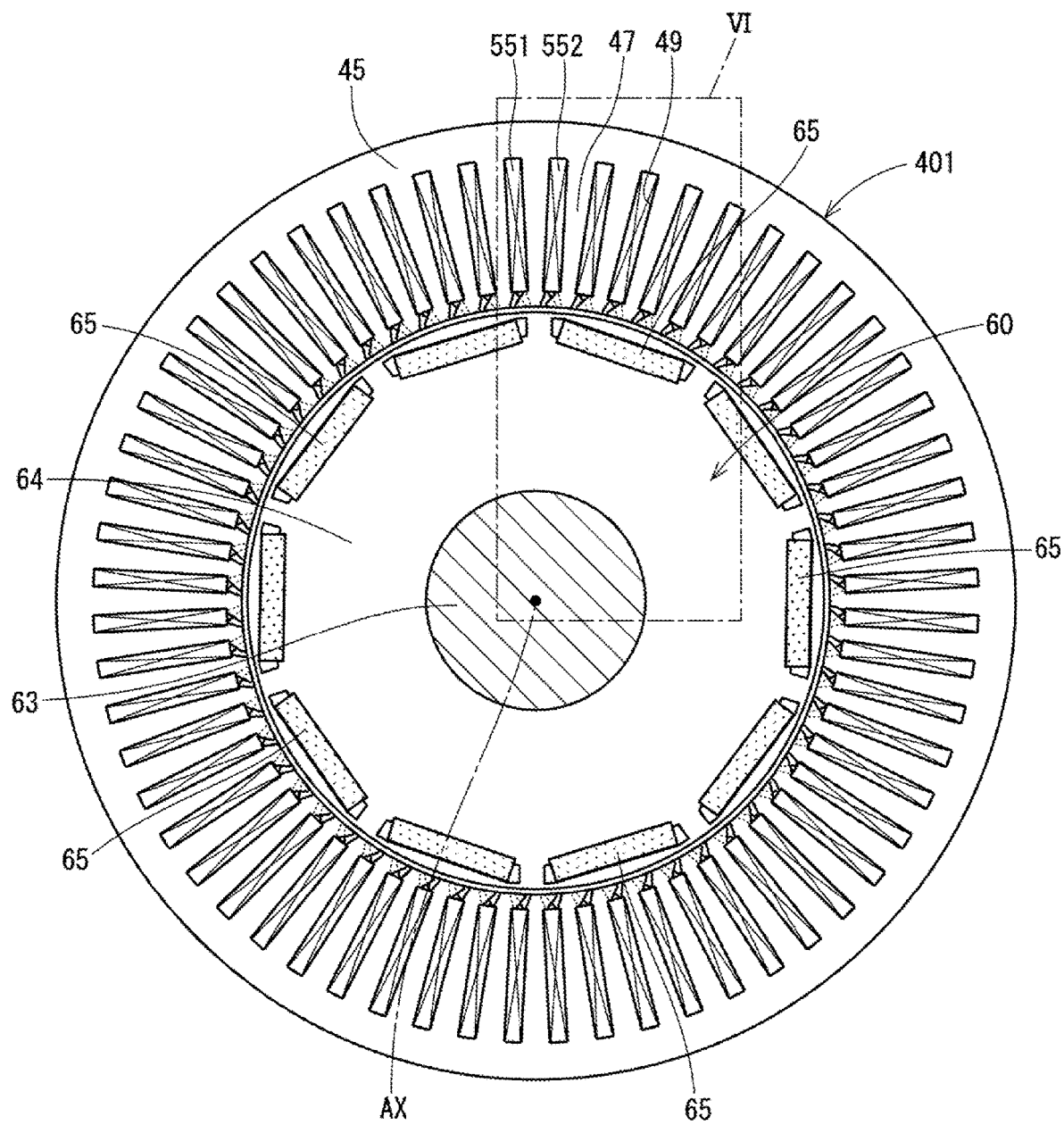
FIG. 5 is a cross-sectional view of a stator and a rotor of FIG. 2 taken along a line V-V.
Figure 6:
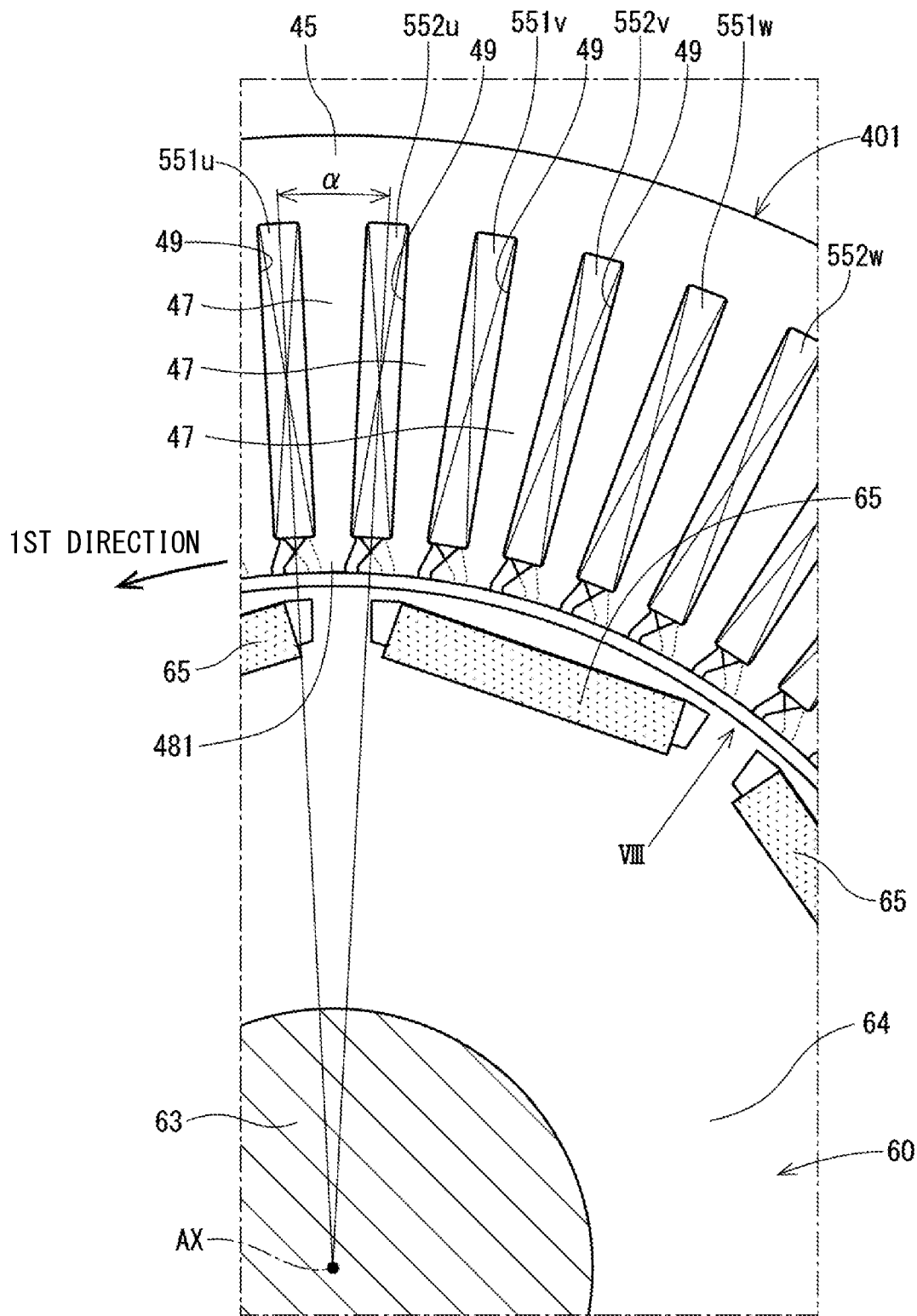
FIG. 6 is an enlarged cross-sectional view of a portion VI in FIG. 5.
Figure 7:
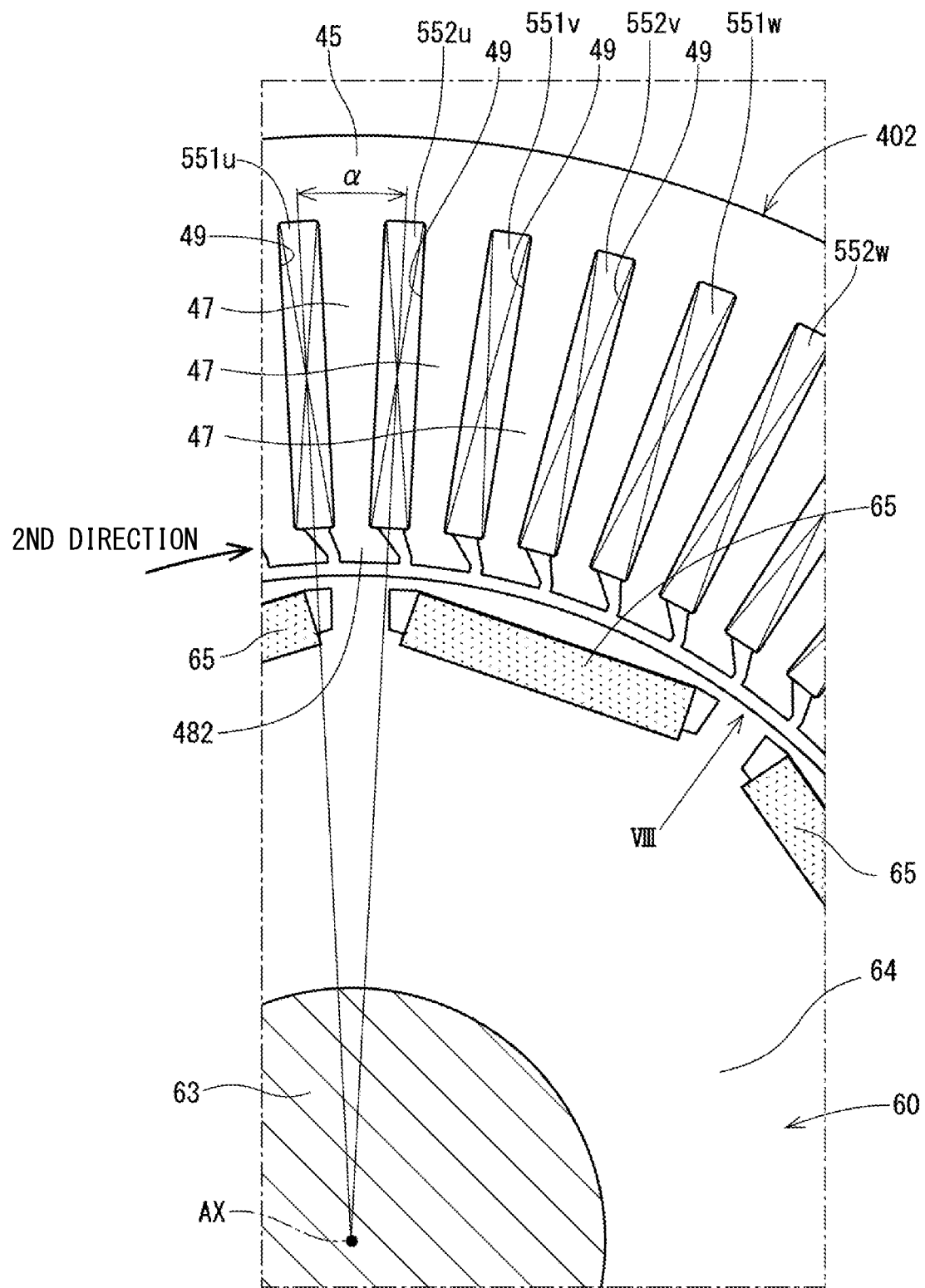
FIG. 7 is an enlarged cross-sectional view of the stator and the rotor taken along a line VII-VII in FIG. 2 and taken as a portion corresponding to FIG. 6.
Figure 8:
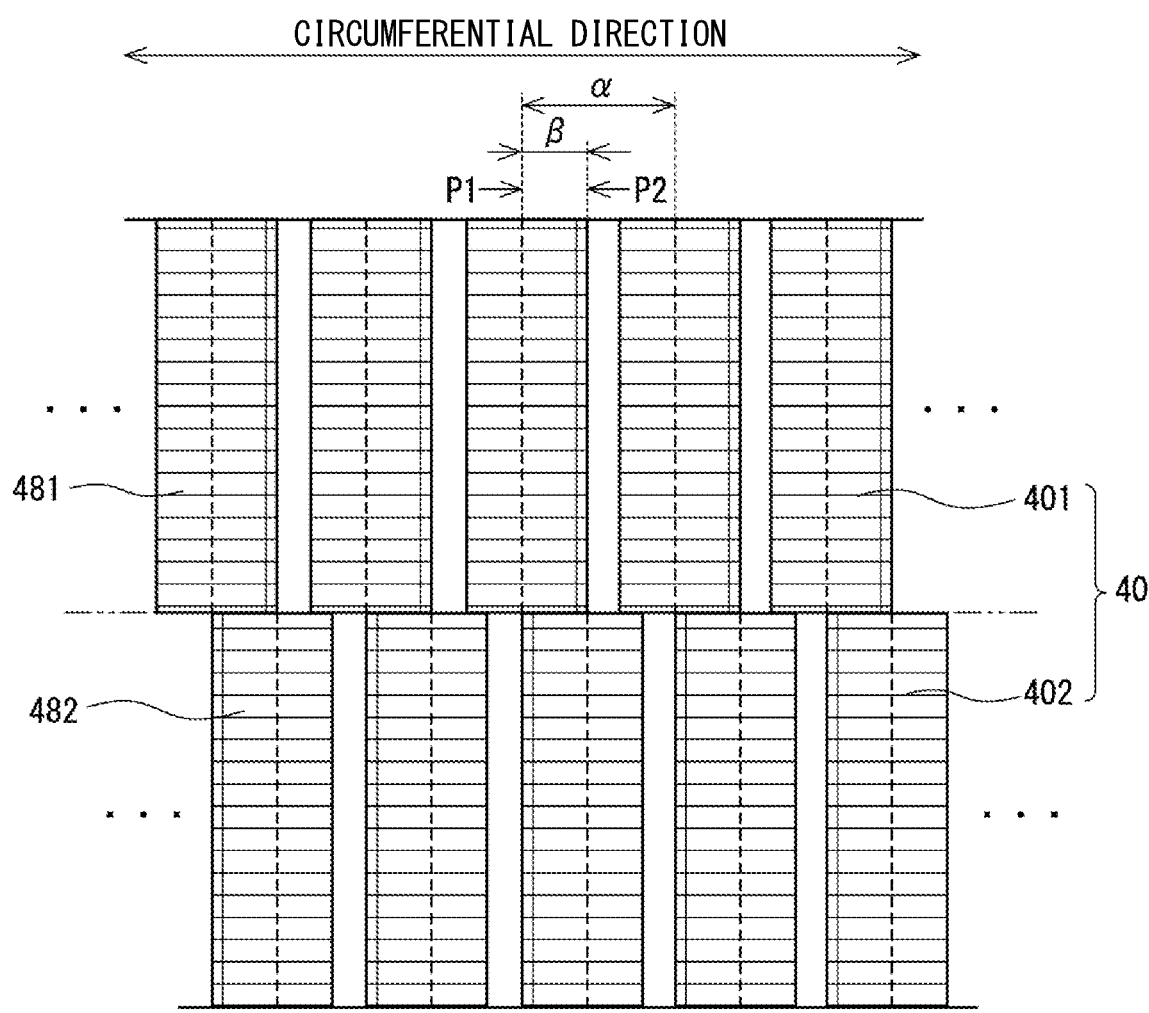
FIG. 8 is a development view of an inner wall of the stator as seen in an arrow VIII direction in FIGS. 6 and 7.

FIG. 5 shows a cross-sectional view of the rotor 60 and the first stator 401 as seen from the heat sink 20 side. FIGS. 6 and 7 are enlarged cross-sectional views of the first stator 401 and the second stator 402, respectively. FIGS. 5 to 7 are assumed as respectively showing a boundary surfaces between the two stator cores, and the stator core portion is not hatched. FIG. 8 shows a circumferential positional relationship between a skew forming portion 481 of the first stator 401 and a skew forming portion 482 of the second stator 402.

As shown in FIG. 5, the rotor 60 has an interior permanent magnet (IPM) structure in which a plurality of permanent magnets 65 are embedded along the outer periphery of a plurality of the stacked layers of the rotor core 64. In a surface permanent magnet (SPM) structure in which the permanent magnet is arranged on the outer peripheral surface of the rotor core 64, it is generally necessary to process the outer peripheral surface of the permanent magnet into a circular arc shape, whereas in the IPM structure, the rectangular parallelepiped permanent magnet 65 is used without rounding processing. Therefore, the number of processing steps is reduced. The shaft 63 is fixed at the center of the stacked layers of the rotor core 64.

The configuration of the stator 40 of the present embodiment conforms to a configuration disclosed in a Japanese Patent Laid-Open No. 2019-30074 (i.e., in a corresponding US publication: US2019/0036389 A1). The first stator 401 and the second stator 402 have an annular back yoke portion 45 and a plurality of teeth 47 that protrude radially inward from the back yoke portion 45. A slot 49 in which two sets of three-phase windings 551 and 552 are wound is formed between two adjacent teeth 47. As shown in FIGS. 6 and 7, each slot 49 includes a first system U-phase winding 551$u$, a second system U-phase winding 552$u$, a first system V-phase winding 551$v$, a second system V-phase winding 552$v$, a first system W-phase winding 551$w$, and a second system W-phase winding 552$w$ respectively wound in order.

Further, the stator 40 has a step skew structure in which the circumferential position of the teeth is bent according to the position along the axial direction. In the first stator 401 shown in FIG. 6, the skew forming portion 481 at a tip of the tooth 47 is formed so as to be shifted from a center of the tooth 47 (i.e., from a radius line extending from the rotation axis Ax) in the first direction, i.e., to one circumferential direction. In the second stator 402 shown in FIG. 7, the skew forming portion 482 at a tip of the tooth 47 is formed so as to be shifted from the center of the tooth 47 in the second direction, which is the other circumferential direction.

An angle between the two adjacent teeth 47 or between the two adjacent slots 49 is represented as $\alpha$. The angle $\alpha$ means a phase difference between the first system and the second system, and corresponds to an electric angle of 30° in the present embodiment. Further, as shown in FIG. 8, the phase difference between a circumferential center position P1 of the skew forming portion 481 of the first stator 401 and a circumferential center position P2 of the skew forming portion 482 of the second stator 402 is represented by $\beta$. In the present embodiment, the skew forming portions 481 and 482 are formed to set the phase difference $\beta$ to an electric angle of 15°.

By configuring the step skew structure so as to satisfy a relationship of "$\alpha > \beta$," it is possible to cancel the double order component of the 6th order torque ripple, that is, the 12th order torque ripple. Therefore, NV property is further improved.

Figure 9A:
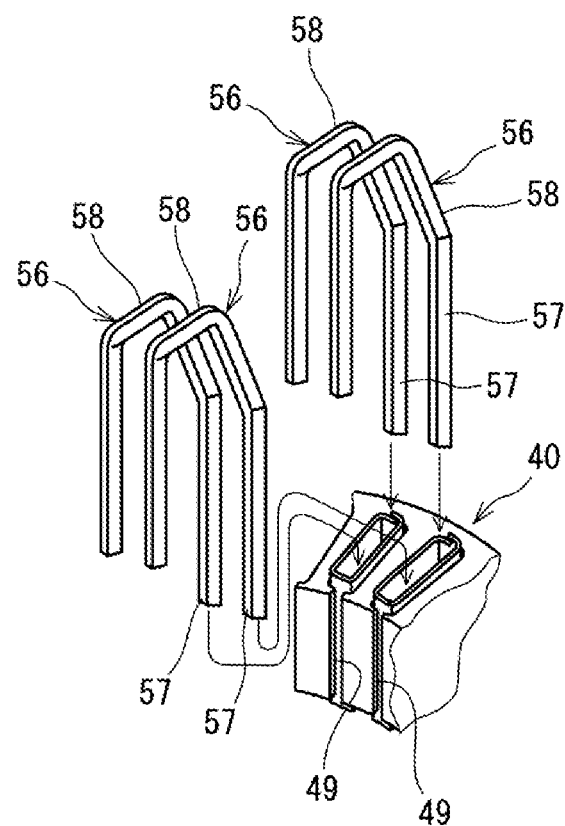
FIG. 9A is a perspective view of an SC winding.

FIG. 9 illustrates a method called "SC winding" or "distributed winding" using a segment conductor 56 as a specific example of the wiring configuration of the three-phase winding 55. As shown in FIG. 9A, the segment conductor 56 is formed by bending a flat and square-section conductor into a substantially U shape, providing a pair of insertion portions 57 that are parallel to each other and a turn portion 58 that connects one end of the insertion portions 57. The insertion portion 57 is inserted into the slot 49 of the stator 40 via an insulator. Note that FIG. 9A uses a drawing of a stator core not having a step skew structure, and the skew forming portions 481 and 482 in FIGS. 6 to 8 are not shown.

Figure 9B:
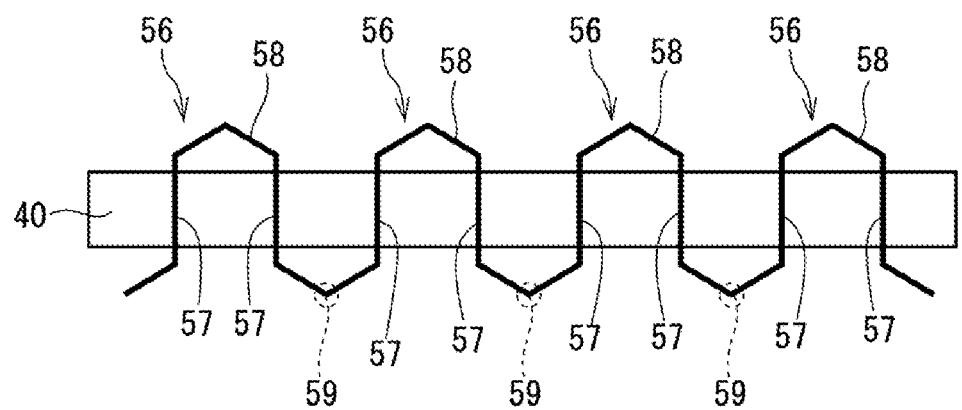
FIG. 9B is a schematic development view of the SC winding.

As shown in FIG. 9B, the insertion portion 57 penetrating the slot 49 of the stator 40 of one conductor 56 is bent at the tip so as to be close to the insertion portion 57 of the adjacent segment conductor 56, and is welded or the like for connection at a connection portion 59. By connecting the segment conductors 56 at the connection portions 59, a wound state of the three-phase winding 55 substantially wound around the stator 40 is realized.

Figure 10:
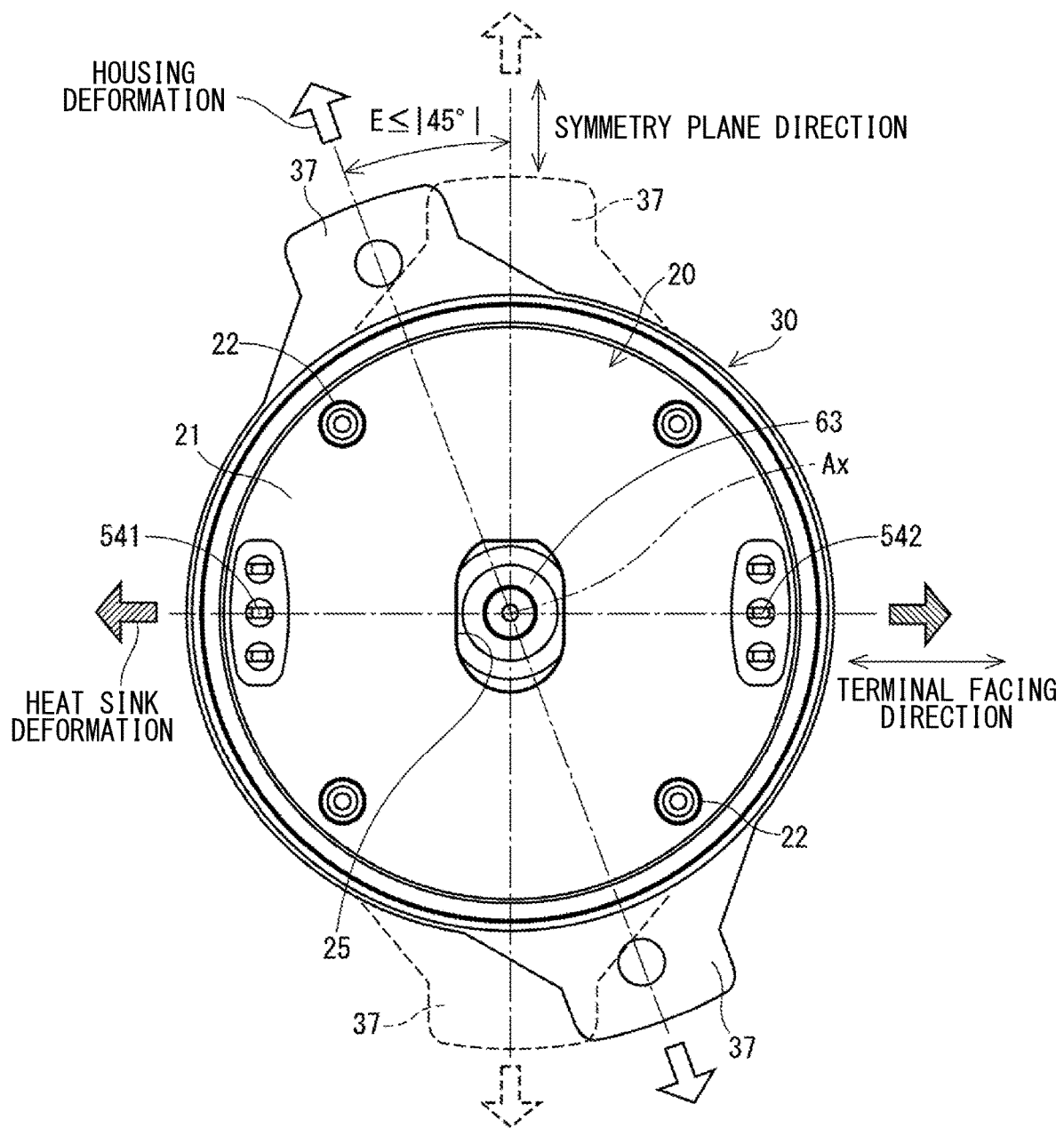
FIG. 10 is a cross-sectional view taken along a line X-X in FIG. 2.

Next, the configuration of the heat sink 20 is supplemented with reference to FIG. 10. FIG. 10 is a view of the housing 30 as seen from the cover 14 side of the heat sink 20 with the cover 14 and the board 15 of FIG. 2 removed. A direction in which the two motor terminals 541 and 542 face each other in the left-right direction in FIG. 10 is defined as a "terminal facing direction." Further, a direction perpendicular to the terminal facing direction, which is a vertical direction of FIG. 10, is defined as a "symmetry plane direction."

In FIG. 10, the shaft hole 25 through which the shaft 63 passes has an oval shape having a major axis in the symmetry plane direction and a minor axis in the terminal facing direction. In such manner, the receiving surface 24 is securely provided for a caulking operation after holding the rear bearing 62 in the rear bearing holder portion 23 of the heat sink 20, thereby improving the assemblability (see FIG. 2).

In addition, an angle of the direction of the stay portion 37 of the housing 30 with respect to the symmetry plane direction is designated as "E." Here, the angle E is set in a range where the absolute value is 45° or less. That is, the stay portion 37 of the housing 30 is provided within a range of ±45° from the symmetry plane direction regardless of whether the clockwise or counterclockwise angle is defined as positive with respect to the symmetry plane direction.

The intention of such configuration is to ensure roundness after a shrink fit. After a shrink fit, the heat sink 20 is easily deformed in the terminal facing direction, which is the minor axis direction of the shaft hole 25. Further, the housing 30 is easily deformed in the direction of the stay portion 37. Therefore, by bringing the minor axis direction of the shaft hole 25 and the direction of the stay portion 37 close to orthogonal, the deformation is canceled and the roundness after a shrink fit is heightened. In such manner, NV property is improved.

From such point of view, it may be most preferable that the stay portion 37 is provided in a direction parallel to the symmetry plane direction, that is, in a direction where the angle E is 0°, as indicated by a broken line. However, there are cases where the angle E cannot be set to 0° due to restrictions on the layout. Even in such a case, by setting the angle E within a range of ±45°, an effect of increasing the roundness after a shrink fit is obtained to some extent.

OTHER EMBODIMENTS (A) The present disclosure is not limited to an application to an electromechanical-integrated type motor in which the ECU 10 including the board 15 on which the drive circuits 701 and 702 are implemented is integrated with the motor 80, but may also be applicable to a motor having separate bodies for motor mechanism and control circuit connected thereto with wire harness. In such case, the rear frame 20 does not have to function as a heat sink from which the heat generated by the elements on the substrate is dissipated, and may simply be a member that holds the rear bearing 62 in the opening of the housing 30.

(B) The rotor 60 is not limited to the IPM structure, and may be configured as the SPM structure in which the permanent magnet 65 is provided on the surface of the rotor core 64. Further, in the stator 40, the teeth 47 may be formed in parallel with the shaft over the entire range along the axial direction, instead of having the step skew structure.

(C) The stator 40 is not limited to a configuration in which a plurality of layers of thin plate-shape stator cores integrally formed along the circumference are stacked, but may also be configured as one thick plate-shaped stator core integrally formed along the circumference. Further, the rotor 60 is not limited to the layered structure, but may be formed to have an integral rotor core.

(D) The housing 30 is not limited to a bottomed cylindrical shape in which the bottom portion 34 is formed integrally with the cylindrical portion 32, but may have a different configuration in which, for example, a separate front plate is attached onto the cylindrical portion to serve as the bottom portion. In such case, like the stator 40 and the rear plate 20, the front plate may also be fixed onto the inner wall of the housing by an interference fit.

The present disclosure should not be limited to the embodiments described above, and various other embodiments may be implemented without departing from the scope of the present disclosure.

What is claimed is:

1. A motor comprising:
a cylindrical housing including at least one of aluminum or aluminum alloy in a cylinder shape;
a stator including at least one of iron or iron alloy;
a rotor; and
a rear frame including at least one of aluminum or aluminum alloy, wherein
the stator is fixed onto an inner wall of the cylindrical housing by an interference fit, and two sets of three-phase windings are wound thereon so that a phase difference between the two sets of windings is $(30\pm60\times n)°$, where n is an integer,
the rotor is provided inside the stator, has a plurality of permanent magnets embedded along an outer periphery, and rotates about a shaft by a rotating magnetic field generated by the stator due to energization of the three-phase windings, and
the rear frame is fixed onto the inner wall of the housing by an interference fit, and holds a rear bearing that rotatably supports the shaft on one side of the rear frame in an axial direction,
wherein
a fastening margin between the stator and the housing is greater than a fastening margin between the rear frame and the housing,
a stator fixing portion comprises a first portion of the housing that is shrink fitted to an outer wall of the stator,
a rear frame fixing portion comprises a second portion of the housing that is shrink fitted to an outer wall of the rear frame, and
a thickness of the stator fixing portion in a radial direction of the housing is greater than a thickness of the rear frame fixing portion in the radial direction, and
the housing has
a first portion at which the stator and the housing are fixed by the interference fit,
a second portion at which the rear frame and the housing are fixed by the interference fit,
a third portion that is an outer wall protruding from the second portion in the axial direction and surrounds an outer periphery of the rear frame, and
a thickness t2 of the first position, a thickness t1 of the second position, and a thickness t0 of the third position satisfy: t2>t1>t0.

2. The motor according to claim 1, wherein a thickness of a portion of the housing in which the stator is put by an interference fit is greater than a thickness of a portion of the housing in which the rear frame is put by an interference fit.

3. The motor according to claim 1, wherein
the stator is configured by one stator core formed in a circumferential direction or a plurality of stator cores integrally formed in the circumferential direction and stacked along the axial direction.

4. The motor according to claim 1, wherein
an axial length of a fixing portion between the rear frame and the housing is greater than an axial distance between the rear frame and the stator along the inner wall of the housing.

5. The motor according to claim 1, wherein
an axial length of a fixing portion between the rear frame and the housing is greater than 0.4 times of a thickness of the stator.

6. The motor according to claim 1, wherein
the rotor is provided with an IPM structure in which the plurality of permanent magnets are embedded,
the stator is formed by stacking a plurality of stator cores respectively having an annular back yoke portion and a plurality of teeth protruding radially inward from the back yoke portion, and has a step skew structure in which a circumferential position of the plurality of teeth is twisted according to a position along an axial direction.

7. The motor according to claim 1, wherein
the rear frame supports a board on which two drive circuits for applying a voltage to the two sets of three-phase windings are implemented, and functions as a heat sink that dissipates heat generated by elements on the board.

8. The motor according to claim 7, wherein
a thickness of a main body excluding local protrusions in the rear frame that functions as the heat sink is greater than one sixth of an axial length from a mounting seat surface on a stator side of the housing to an end surface on a frame side of the housing.

9. The motor according to claim 1, wherein
the stator is fixed onto the inner wall of the housing by shrink fit, and
a heat sink is fixed onto the inner wall of the housing by shrink fit.

10. The motor according to claim 1, wherein
the fastening margin between the stator and the housing is a dimension by which the housing shrinks when the shrink fit of the stator to the housing is implemented by increasing temperature of the housing, and
the fastening margin between the rear frame and the housing is a dimension by which the housing shrinks when the shrink fit of the rear frame to the housing is implemented by increasing temperature of the housing.

11. The motor according to claim 1, wherein the rear frame includes a tubular potion, which is fixed to the housing by the interference fit, and a collar portion, which extends from the tubular potion in the radial direction, the tubular potion and the collar portion define a step therebetween, the collar portion is in contact with a step defined between the second portion and the third portion of the housing in the axial direction, and the collar portion and the third portion of the housing form a clearance therebetween in the radial direction.

* * * * *